US 008144431B2

(12) United States Patent
Chang et al.

(10) Patent No.: US 8,144,431 B2
(45) Date of Patent: Mar. 27, 2012

(54) FLEX CABLE ASSEMBLY FOR VIBRATION REDUCTION IN HDD APPLICATIONS

(75) Inventors: Jen-Yuan Chang, San Jose, CA (US);
Robert C. Reinhart, San Jose, CA (US);
Edgar D. Rothenberg, San Jose, CA (US);
See C. Young, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1000 days.

(21) Appl. No.: 11/784,134

(22) Filed: Apr. 4, 2007

(65) Prior Publication Data
US 2008/0247081 A1  Oct. 9, 2008

(51) Int. Cl.
*G11B 5/54* (2006.01)
(52) U.S. Cl. ............................................ 360/264.2
(58) Field of Classification Search ............... 360/265.7, 360/265.9, 266.3, 245.8, 266.1, 264.2
See application file for complete search history.

(56) References Cited

U.S. PATENT DOCUMENTS

| | | | |
|---|---|---|---|
| 4,456,936 A | 6/1984 | Steen et al. | |
| 5,227,937 A | 7/1993 | Magnusson et al. | |
| 5,905,609 A | 5/1999 | Butler et al. | |
| 5,907,452 A | 5/1999 | Kan | |
| 5,923,501 A * | 7/1999 | Suzuki et al. | 360/264.2 |
| 5,953,183 A | 9/1999 | Butler et al. | |
| 6,034,843 A | 3/2000 | Tsujino et al. | |
| 6,271,996 B1 * | 8/2001 | Houk et al. | 360/244.9 |
| 6,334,372 B2 | 1/2002 | Kuo et al. | |
| 6,480,362 B1 | 11/2002 | Yoshida et al. | |
| 6,856,490 B2 | 2/2005 | Rosner et al. | |
| 6,862,156 B1 | 3/2005 | Lin et al. | |
| 6,898,996 B2 | 5/2005 | Freund et al. | |
| 6,934,126 B1 | 8/2005 | Berding et al. | |
| 6,937,442 B2 | 8/2005 | Zhao et al. | |
| 6,992,864 B2 * | 1/2006 | Kaneko et al. | 360/264.2 |
| 2004/0264058 A1 | 12/2004 | Huynh | |
| 2005/0013055 A1 * | 1/2005 | Ho et al. | 360/264.2 |
| 2006/0023340 A1 | 2/2006 | Kim et al. | |
| 2006/0117558 A1 | 6/2006 | Koh et al. | |
| 2006/0139797 A1 | 6/2006 | Suzuki et al. | |

FOREIGN PATENT DOCUMENTS

| | | |
|---|---|---|
| JP | 10269720 | 10/1998 |
| JP | 2001024356 | 1/2001 |

OTHER PUBLICATIONS

Du, et al., "Vibration Analysis and Optimal Control in Self-servo Track Writer", *Seventh International Conference on Control, Automation, Robotics and Vision (ICARV'02)*, (Dec. 2002),156-161.

Peng, et al., "Improvement on a Hard Disk Servo System Using Friction and Distrubance Compensation", *Proceedings of the 2003 IEEE/ASME International Conference on Advanced Inteligent Mechatronics (AIM 2003)*, (2003),1160-1165.

* cited by examiner

*Primary Examiner* — Allen Cao

(57) ABSTRACT

A hard disk drive flex cable assembly conveys data between a connector to a host system and a head stack assembly. It comprises a flex cable which in part has a first end for coupling to the connector, and a second end for coupling to the head stack assembly; and a stiffener coupled to the second end. The stiffener comprises an end formed to approximate a J-shape. A filling material is applied to the concave surface of the J-shape, whereby a dynamic response frequency of the flex cable assembly is moved away from a dynamic response frequency of the head stack assembly upon which the flex cable assembly is coupled.

14 Claims, 5 Drawing Sheets

FLEX CABLE ASSEMBLY FOR VIBRATION REDUCTION IN HDD APPLICATIONS

TECHNICAL FIELD

This invention relates generally to the field of direct access storage devices and in particular to the fabrication and dynamic performance of a Head Stack Assembly (HSA).

BACKGROUND ART

Direct access storage devices (DASD) have become part of every day life, and as such, expectations and demands continually increase for better performance at lower cost. To meet these demands, the mechano-electrical assembly in a DASD device, specifically the Hard Disk Drive (HDD) has evolved to meet these demands.

An HDD is comprised of many complex parts and sub-assemblies. Each of these sub-assemblies has a manufacturing process that is required to produce a sub-assembly that functions as specified and produce these sub-assemblies in a minimal amount of time. Marginally performing sub-assemblies when coupled with other sub-assemblies can lead to marginal performance of the HDD and possibly failure of the entire HDD. Rejects and failures of sub-assemblies and longer than necessary manufacturing time equate to added cost to the final HDD.

SUMMARY OF THE INVENTION

Various embodiments of the present invention are described herein. A hard disk drive flex cable assembly conveys data between a connector to a host system and a head stack assembly. It comprises a flex cable which in part has a first end for coupling to the connector, and a second end for coupling to the head stack assembly; and a stiffener coupled to the second end. The stiffener comprises an end formed to approximate a J-shape. A filling material is applied to the concave surface of the J-shape, whereby a dynamic response frequency of the flex cable assembly is moved away from a dynamic response frequency of the head stack assembly upon which the flex cable assembly is coupled.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a flex cable assembly whereby desirable performance of an HDD can be enabled. The discussion will then focus on embodiments of the present invention by which a stiffener component when coupled to a flex cable assembly and consequently to a head stack assembly (HSA) can present desirable dynamic performance of the HSA. The implementation of embodiments of the present invention will then be discussed.

Overview

Figure 1:
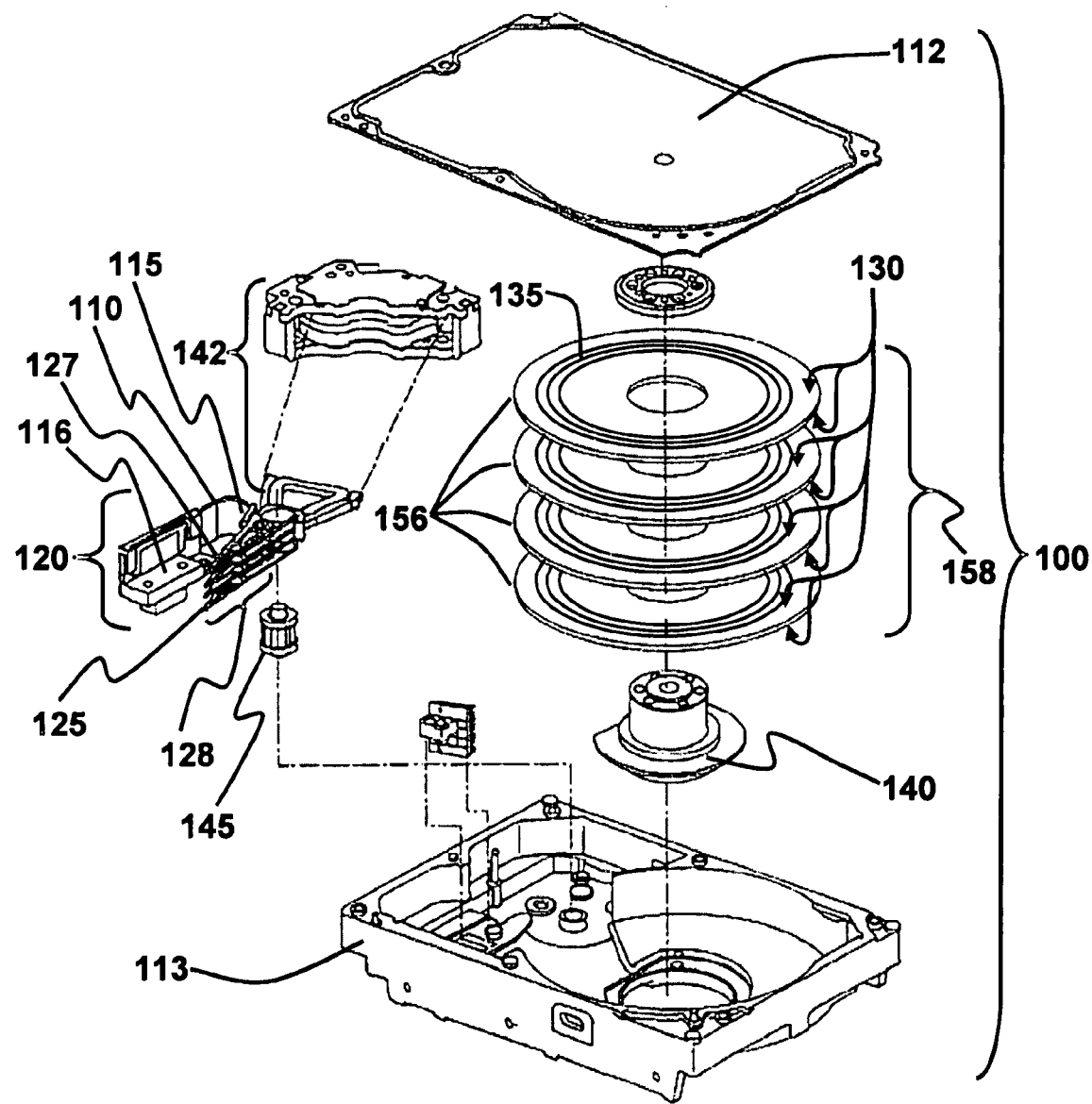
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and HSA 120. Disk stack 158 is coupled to base casting 113 by means of motor-hub assembly 140. Motor-hub assembly 140 will have at least one disk 156 coupled to it such that disk 156 can rotate about an axis common to motor-hub assembly 140 and the center of disk 156. Disk 156 has at least one surface 130 upon which reside data tracks 135. HSA 120, sometimes referred to as an actuator assembly, comprises in part suspension 127, which suspends hard disk drive slider 125 next to disk surface 130, and connector 116, which conveys data between arm electronics (A/E) 115 and a host system wherein HDD 100 resides. Suspension 127 and hard disk drive slider 125 comprise in part head gimbal assembly (HGA) 128. Flex cable 110, which is part of HSA 120, conveys data between connector 116 and A/E 115.

HSA 120 is coupled pivotally to base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled to base casting 113 to enclose these components and sub-assemblies into HDD 100.

One of ordinary skill in the art can appreciate that as HSA 120 is actuated by VCM 142, flex cable 110 may influence in an undesirable manner the ability of HSA 120 to move. Examples of undesirable influence that a flex cable may have on the movement of an HSA can be put into two categories. One is dynamic response; the other is impeding the actuation of VCM 142.

A dynamic response frequency of vibration of the flex cable may be close to a dynamic response frequency of the HSA. Two frequencies may combine to amplify and/or shift the overall frequency of the HSA. A change in the dynamic response frequency of an HSA can cause difficulties in designing and implementing an efficient servo system.

The stiffness of the flex cable can also vary if the two ends of a flex cable are not properly aligned to each other. Improper alignment can be described as any alignment condition that inhibits the free flexing, also known as a rolling, of the flex cable. An example of improper flex cable alignment is a condition in which the two end boundaries of a flex cable are not parallel. In other words, the flex cable assembly is attached to the HSA and the base casting such that there exists a twist in the flex cable. Variations in flex cable stiffness may cause varying resistance to the actuation of a VCM and thus variations in the power required by the VCM. If the twist in the flex cable is variable and inconsistent from one HSA assembly to another, varying stiffness of the flex cable can also cause variations in an HSA's natural frequency.

Physical Description

Figure 2:
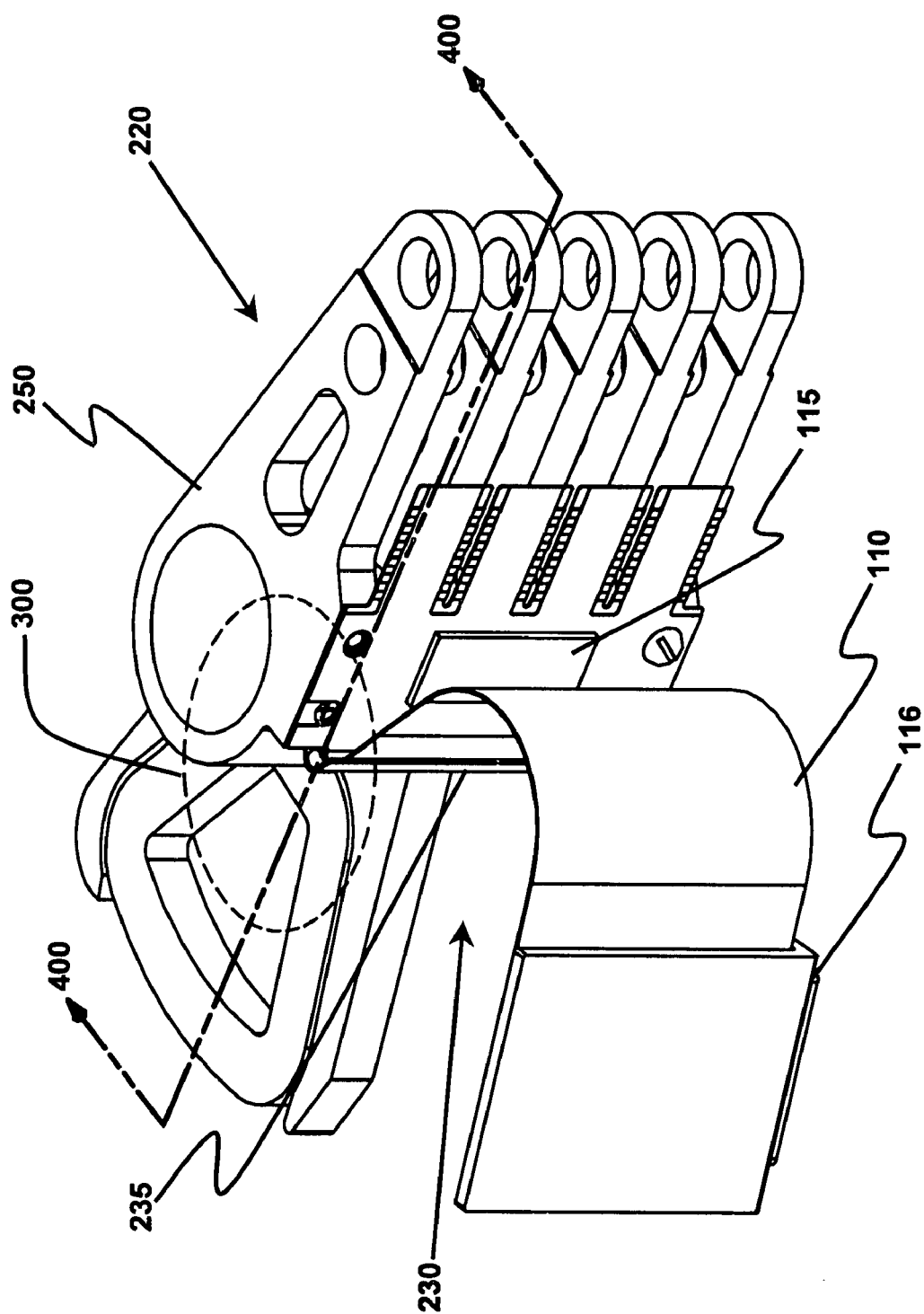
FIG. 2 is an isometric of a head stack assembly (HSA) in accordance with one embodiment of the present invention.

With reference to FIG. 2, an isometric of comb assembly 220, which is typically used in HSA 120, is presented in accordance with an embodiment of the present invention. Flex cable assembly 230 is comprised of flex cable 110, stiffener 235, arm electronics (A/E) 115, and connector 116. One end of flex cable 110 is coupled to connector 116. The other end of flex cable 110 is coupled to comb assembly 220 via stiffener 235. Flex cable 110 is adhesively coupled to stiffener 235. Flex cable 110 assumes the approximate shape to that which stiffener 235 is formed.

Stiffener 235 is formed at one end to approximate the shape of the letter "J." Flex cable 110 is typically coupled to stiffener 235 prior to forming the end stiffener 235 into the approximate J-shape. Flex cable 110 may alternatively be coupled to stiffener 235 after the forming of stiffener 235 into a J-shape. The sequence of forming stiffener 235 and the coupling of flex cable 110 to stiffener 235 does not detract from the spirit of the embodiment of the present invention.

A/E 115 is coupled to flex cable 110. During normal operation, A/E 115 typically generates heat that needs to be dissipated. A/E 115 along with flex cable 110 are coupled to actuator comb 250 of HSA 120 via stiffener 235. Stiffener 235 conducts heat from A/E 115 and into actuator comb 250. Actuator comb 250 dissipates the heat into the enclosure of the HDD, which is then conducted out into environment. To enhance thermal conduction from A/E 115, stiffener 235 is made from a thermally conductive material such as aluminum, steel, metal alloy or composite, or a thermally conductive plastic.

Figure 3:
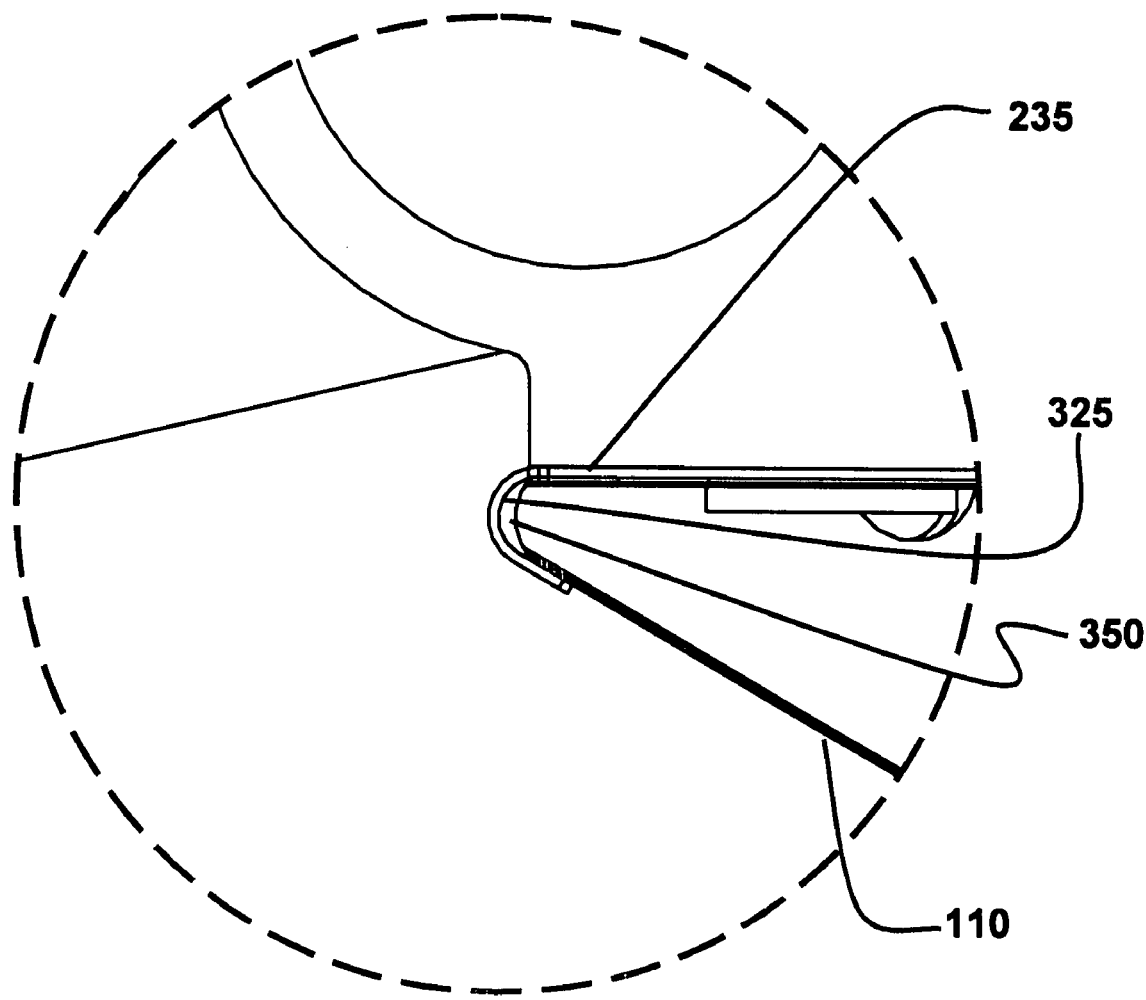
FIG. 3 is a top view detail of a flex cable assembly for an HDD in accordance with one embodiment of the present invention.

With reference to FIG. 3, a top view detail 300 of a flex cable assembly for an HDD is presented in accordance with an embodiment of the present invention. Flex cable assembly 230 is comprised of flex cable 110, stiffener 235, arm electronics (A/E) 115, and connector 116. One end of flex cable 110 is coupled to connector 116. The other end of flex cable 110 is coupled to actuator comb 250 via stiffener 235. Stiffener 235 is formed at one end to approximate a J-shape. In so doing, flex cable 110 assumes the shape of the J-shaped stiffener 235 and thusly, the end of flex cable 110 coupled to connector 116 is directed away from VCM 142 if assembled into HDD 100.

The rigidity of stiffener 235 is influenced by several factors, for example: the inherent material properties of the material used for fabricating a stiffener; the shape of a stiffener perpendicular to the plane of bending; and the thickness of the material used to fabricate a stiffener. It is well known in the art that for the purposes of flex cable dynamics and its dynamic response frequencies, it is desirable to have a rigid stiffener 235. Flex cable 110 may be treated as a beam when considering its dynamic frequencies. It is well known in the art that a rigid boundary condition for a beam can cause the dynamic response frequencies of the flex cable to be higher than dynamic response frequencies resulting from a less rigid boundary condition.

As previously mentioned, the rigidity of stiffener 235 can be altered by changing its form, material, and/or thickness. These options may not be practical, considering the restrictions and demands for advancing HDD technology. A more rigid shape of a stiffener is limited by the design of the HSA and may be constrained as to how rigid a form it may have. More rigid material choices may be limited to compatibility with the HDD environment or possibly a preferred mode for manufacturing a stiffener. A more rigid thickness of material from which the stiffener is fabricated is limited in part by the added mass it might give to the stiffener. It is well known to one of ordinary skill in the art that it is desirable to have the lowest mass possible for an HSA to allow faster accessing time with minimal power requirements on a VCM. Adding mass to one component of an HSA, such as a stiffener has a compounding effect for balance and mass of an HSA.

To this end, and in accordance with an embodiment of the present invention, the boundary condition of flex cable 110 that is provided by stiffener 235 can be groomed to produce a desired dynamic frequency response without suffering the aforementioned limitations. A desired dynamic frequency response of flex cable 110 in part is to separate the dynamic frequency responses of flex cable 110 from the dynamic frequency responses of HSA 120. Another desired dynamic frequency response for flex cable 110 is to have its dynamic frequency response attenuated such that its motion from its dynamic frequency response is not transferred into HSA 120. In accordance with an embodiment of the present invention, attenuation, better known as vibration damping can be achieved by using a viscoelastic material for filler material 350 such as RTV or a pressure sensitive adhesive tape. A specific type of viscoelastic damping, known in the art as constrained layer damping can also be achieved by coupling flex cable 110 to stiffener 235 with a viscoelastic adhesive such as 3M™-110 or 3M™-112.

With continued reference to FIG. 3 and in accordance with an embodiment of the present invention, filler material 350 is added to concave surface 325 of stiffener 235. In so doing, stiffener 235 is made rigid by increasing its thickness only in a relatively small section of stiffener 235. While concave surface 325 is conveniently shaped to confine filler material 350 on stiffener 235, it is equally effective and in the spirit of the embodiment of the present invention to add filler material on the convex surface, opposite concave surface 325. Filler material 350 may be any number of materials that can adhere to concave surface 325 such as a stiff adhesive from any one of the adhesive families such as epoxy and acrylic.

In accordance with the embodiment of the present invention, increasing the rigidity of stiffener 235 moves a dynamic response frequency of flex cable 110 away from a dynamic response frequency of HSA 120. In separating the dynamic response frequencies, deleterious effects of amplified and/or shifted overall frequencies of HSA 120 are avoided.

Figure 4:
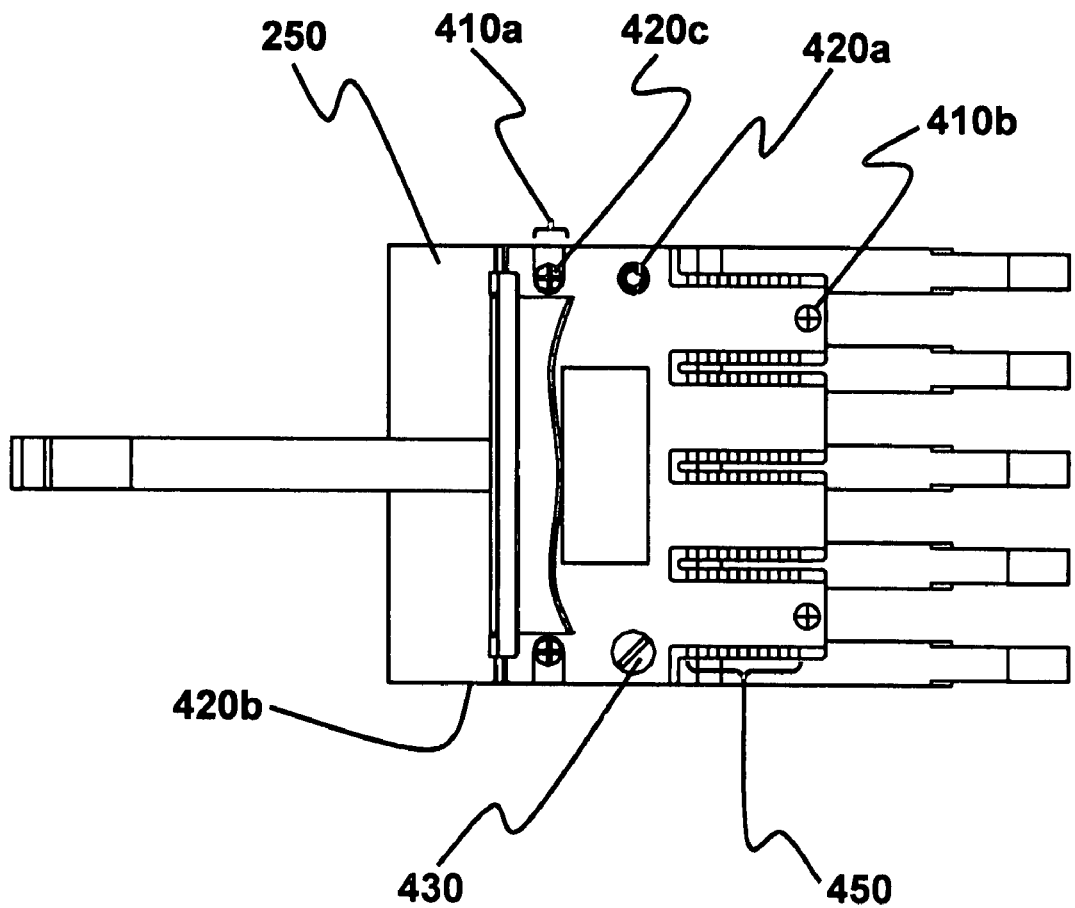
FIG. 4 is a front view detail of a comb assembly for an HDD in accordance with one embodiment of the present invention.

With reference to FIG. 4 a front view detail 400 of a comb assembly for an HDD is presented in accordance with an embodiment of the present invention. Flex cable assembly 230 is comprised of flex cable 110, stiffener 235, arm electronics (A/E) 115, and connector 116. One end of flex cable 110 is coupled to connector 116. The other end of flex cable 110 is coupled to actuator comb 250 via stiffener 235. An alignment feature, known as fiducial 410(*a, b*) is fabricated as part of the flex cable fabrication process. Fiducial 410(*a, b*) has a specified and approximately constant relationship to flex cable 110. It is used to optically align flex cable assembly 230 to actuator comb 250 for use in HSA 120.

Fiducial 410(*a, b*) can be fabricated in several forms. For example, fiducial 410*a* can be part of the profile of flex cable 110, such as a notch. Fiducial 410*a* can also be a hole in flex cable 110. Fabricating fiducial 410*a* to have profile such as a notch or a hole typically provides preferred alignment of the body of flex cable 110 to actuator comb 250 thus minimizing a possible twist of flex cable 110 during coupling of flex cable assembly 230 to actuator comb 250. Fiducial 410b can also be fabricated as a feature in the conductor layer which typically comprises a trace of flex cable 110. Fabricating fiducial 410b as a feature in the conductor layer typically provides preferred alignment of termination pads 450 to actuator comb 250 for future termination to HGA 128.

At least one fiducial 410(a, b) is required to align flex cable assembly 230 in x and y direction. Typically a second fiducial is required to effect angular alignment. It is possible to achieve angular alignment by using a feature on flex cable assembly 230 that was not intended to be used as a fiducial, but through its use for alignment, becomes a fiducial. Examples of a feature that can be used as a fiducial, wherein it was not designed for use as a fiducial are an edge, whole, and trace of flex cable 110.

Similarly, a feature on actuator comb 250 can be used as fiducial 420(a, b, c) to align with fiducial 410(a, b) on flex cable assembly 230. An example of an existing feature used as a fiducial is screw hole 420a, which is exposed before screw 430 is used to couple flex cable assembly 230 to actuator comb 250. Another example of an existing feature used as a fiducial is datum surface 420b of actuator comb 250. A feature 420c can be especially made as a fiducial, such as a hole dedicated for alignment or a cross that can be scribed, etched or cast into actuator comb 250.

By using a system of fiducials and optical alignment to align flex cable assembly 230 to actuator comb 250 for use in HSA 120, the components and cost of HSA 120 can be reduced. Common practice has been to align flex cable assembly to actuator comb by using precise features or datums that physically contact and align to each other. These features have typically been precision pins pressed into a comb, and corresponding precision holes fabricated into a flex cable. After placing the precision holes over the precision pins, the pins were joined to the holes through a bonding process such as soldering or adhesive bonding, both of which are time consuming processes.

Machine vision alignment and the use of fiducials allow for the relaxing of tolerances on the diameters of holes and pins. Since the center locations of pins and holes are optically located and aligned to, the tolerance on the hole and pin diameters is of less importance for alignment. Machine vision alignment is well known to those skilled in the art. The increased throughput that can be achieved with a machine vision alignment system is appreciated by those of ordinary skill in the art. By using machine vision alignment with a mechanical coupling system, such as screws, adhesive, welds, braze, or solder, the cost of HSA 120 can be reduced.

Operation

Figure 5:
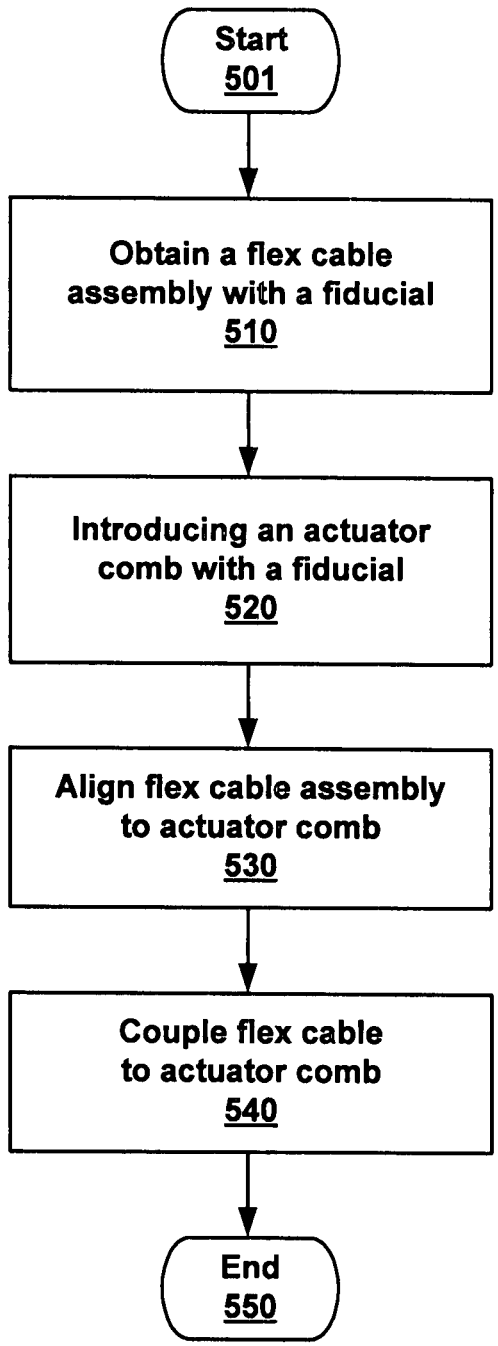
FIG. 5 is a flow chart illustrating steps of a fabrication process for a head stack assembly for an HDD in accordance with one embodiment of the present invention.

FIG. 5 is a flow chart of a process 500 in which particular steps are performed in accordance with an embodiment of the present invention for fabricating a comb assembly for use in a hard disk drive whereby cost of the comb assembly is reduced. Although specific steps are disclosed in process 500, such steps are exemplary. That is, the embodiment(s) of the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

Process 500 will be described with reference to elements shown in FIGS. 1, 2, and 4.

In step 501 of process 500, a suitable assembly environment should be established wherein an environment is controlled to meet the requirements of the next level of assembly, such as a head stack assembly and possibly an HDD.

In step 510 of process 500, flex cable assembly 230 is obtained in an embodiment of the present invention. Flex cable assembly 230 is comprised of flex cable 110 which has been fabricated to have at least one fiducial 410. Fiducial 410a may be fabricated by any one of the patterning process such as etching, punching or laser trimming, known to on skilled in the art. Fiducial 410b may be fabricated with photolithographic processes, which are well known in the art, in the conductor layer which typically comprises a trace of flex cable 110.

In step 520 of process 500, actuator comb 250 in an embodiment of the present invention is introduced wherein at least one fiducial 420(a, b, c) is fabricated. Fiducial 420(a, b, c) can be an existing feature such as a screw hole or edge of actuator comb 250, or can be a feature especially made as a fiducial, such as a hole dedicated for alignment or a mark that can be scribed, etched or cast into actuator comb 250.

In step 530 of process 500, flex cable assembly 230 is aligned to actuator comb 250 in an embodiment of the present invention by means of fiducials (410, 420(a, b, c)). The process of aligning flex cable assembly 230 to actuator comb 250 comprises recognizing fiducial 410(a, b) on flex cable 110 of flex cable assembly 230, registering actuator comb 250 to a vision recognition system, measuring the orientation of at least one fiducial 410(a, b) with respect to at least one fiducial 420(a, b, c), computing a movement such that when executed will result in a predetermined location of flex cable assembly 230 with respect to actuator comb 250; and executing the computed movement. The execution of the computed movement comprises translation and/or rotation of flex cable assembly 230 and/or actuator comb 250 with respect to each other.

The registering of actuator comb 250 to a vision system may comprise locating actuator 250 by means of fiducial 420(a, b, c) which in part or in combination comprises mechanical and/or vision recognition coupling. For example datum surface 420b may be coupled to a corresponding datum surface at a predetermined and known location in a vision system. As another example, a position of actuator comb 250 may be recognized by a vision recognition system by means of fiducial 420(a, c), whereby the position of actuator comb 250 is known after a vision recognition system has recognized fiducial 420(a, c).

In step 540 of process 500, flex cable assembly 230 is coupled to actuator comb 250 in an embodiment of the present invention any coupling method such as screwing, gluing, welding, brazing, and soldering.

In step 550 of process 500, the fabrication of a reduced cost comb assembly for use in an HDD is complete and exits process 500.

The present invention, in the various presented embodiments allows for the fabrication of a head stack assembly that has improved dynamic response and reduced cost. One of ordinary skill in the art will appreciate that the components comprising the comb assembly are designed in concert to produce an HSA that improved dynamics and lower assembly cost which carries forward into a better performing HDD.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A hard disk drive flex cable assembly for conveying data between a connector to a host system and a head stack assembly comprising:
   a flex cable comprising;
      a first end for coupling to said connector; and
      a second end for coupling to said head stack assembly; and
   a stiffener coupled to said second end, wherein said stiffener comprises an end formed to approximate a J-shape, wherein a filling material is applied to the concave surface of said J-shape and makes said stiffener rigid by increasing a thickness of said stiffener in a relatively small section of said stiffener, wherein a dynamic response frequency of said flex cable assembly is moved away from a dynamic response frequency of the head stack assembly upon which said flex cable assembly is coupled.

2. The hard disk drive flex cable assembly of claim 1 wherein said flex cable is adhesively coupled to said stiffener prior to forming said J-shape.

3. The hard disk drive flex cable assembly of claim 1 wherein said filling material is a stiff adhesive.

4. The hard disk drive flex cable assembly of claim 1 wherein said filling material is a viscoelastic adhesive.

5. The hard disk drive flex cable assembly of claim 1 wherein said stiffener comprises a thermally conductive material.

6. The hard disk drive flex cable assembly of claim 1 wherein said stiffener is coupled to arm electronics.

7. The hard disk drive flex cable assembly of claim 2 wherein said adhesively coupled flex cable and stiffener comprise viscoelastic adhesive.

8. A hard disk drive comprising:
   a base casting for providing coupling points for components and sub-assemblies of said hard disk drive;
   a motor-hub assembly to which at least one disk is coupled allowing rotation of said disk about an axis approximately perpendicular and centered to said disk, wherein said motor-hub assembly is coupled to said base casting,;
   a head stack assembly comprising:
      at least one arm coupled to at least one head gimbal assembly;
      a pivot means coupled to said base casting allowing said head stack assembly to move said head gimbal assembly arcuately across said disk; and
   a flex cable assembly comprising:
      a flex cable comprising;
         a first end for coupling to a connector; and
         a second end for coupling to said head stack assembly; and
      a stiffener coupled to said second end, wherein said stiffener comprises an end formed to approximate a J-shape, wherein a filling material is applied to the concave surface of said J-shape and makes said stiffener rigid by increasing a thickness of said stiffener in a relatively small section of said stiffener, wherein a dynamic response frequency of said flex cable assembly is moved away from a dynamic response frequency of a head stack assembly upon which said flex cable assembly is coupled.

9. The hard disk drive of claim 8 wherein said flex cable is adhesively coupled to said stiffener prior to forming said J-shape.

10. The hard disk drive of claim 8 wherein said filling material is a stiff adhesive.

11. The hard disk drive of claim 8 wherein said filling material is a viscoelastic adhesive.

12. The hard disk drive of claim 8 wherein said stiffener comprises a thermally conductive material.

13. The hard disk drive of claim 8 wherein said stiffener is coupled to arm electronics.

14. The hard disk drive flex cable assembly of claim 9 wherein said adhesively coupled flex cable and stiffener comprise viscoelastic adhesive.

* * * * *